(12) United States Patent
Lanoue et al.

(10) Patent No.: US 11,548,076 B2
(45) Date of Patent: Jan. 10, 2023

(54) CHUCK FOR MACHINE TOOL AND SEALING SYSTEM

(71) Applicant: PRATT & WHITNEY CANADA CORP., Longueuil (CA)

(72) Inventors: Guy Lanoue, Otterburn Park (CA); Philippe Raymond, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 669 days.

(21) Appl. No.: 16/545,160

(22) Filed: Aug. 20, 2019

(65) Prior Publication Data

US 2021/0023628 A1 Jan. 28, 2021

Related U.S. Application Data

(60) Provisional application No. 62/878,483, filed on Jul. 25, 2019.

(51) Int. Cl.
*B23B 31/00* (2006.01)
*B23B 31/16* (2006.01)

(52) U.S. Cl.
CPC ........ *B23B 31/001* (2013.01); *B23B 31/1627* (2013.01); *B23B 2231/36* (2013.01)

(58) Field of Classification Search
CPC .............. B23B 31/001; B23B 31/1627; B23B 2231/36
See application file for complete search history.

(56) References Cited

U.S. PATENT DOCUMENTS

| 2,903,268 | A | 9/1959 | Buck et al. |
| 6,073,940 | A | 6/2000 | Tabachenko et al. |
| 7,963,527 | B2 * | 6/2011 | Weller ................ B23B 31/1627 279/121 |
| 9,492,874 | B2 | 11/2016 | Maurer |

FOREIGN PATENT DOCUMENTS

EP 2821169 A1 * 1/2015 ........... B23B 31/001
WO WO-2020196582 A1 * 10/2020

* cited by examiner

*Primary Examiner* — Eric A. Gates
(74) *Attorney, Agent, or Firm* — Norton Rose Fulbright Canada LLP

(57) ABSTRACT

A chuck for a machine tool includes a body rotatable about a rotation axis and defining a plurality of slots extending radially in the body, a plurality of jaws received in corresponding ones of the plurality of slots, the jaws being radially movable relative to the body between an inward position and an outward position, and for at least one of the plurality of jaws, a sealing layer disposed in the slot receiving the at least one of the plurality of jaws and sealing an interface between opposed lateral sides of the at least one jaw and a surface of the body defining the slot receiving the at least one of the plurality of jaws. A method of sealing an interface between a surface defining a slot of a chuck is also described.

14 Claims, 5 Drawing Sheets

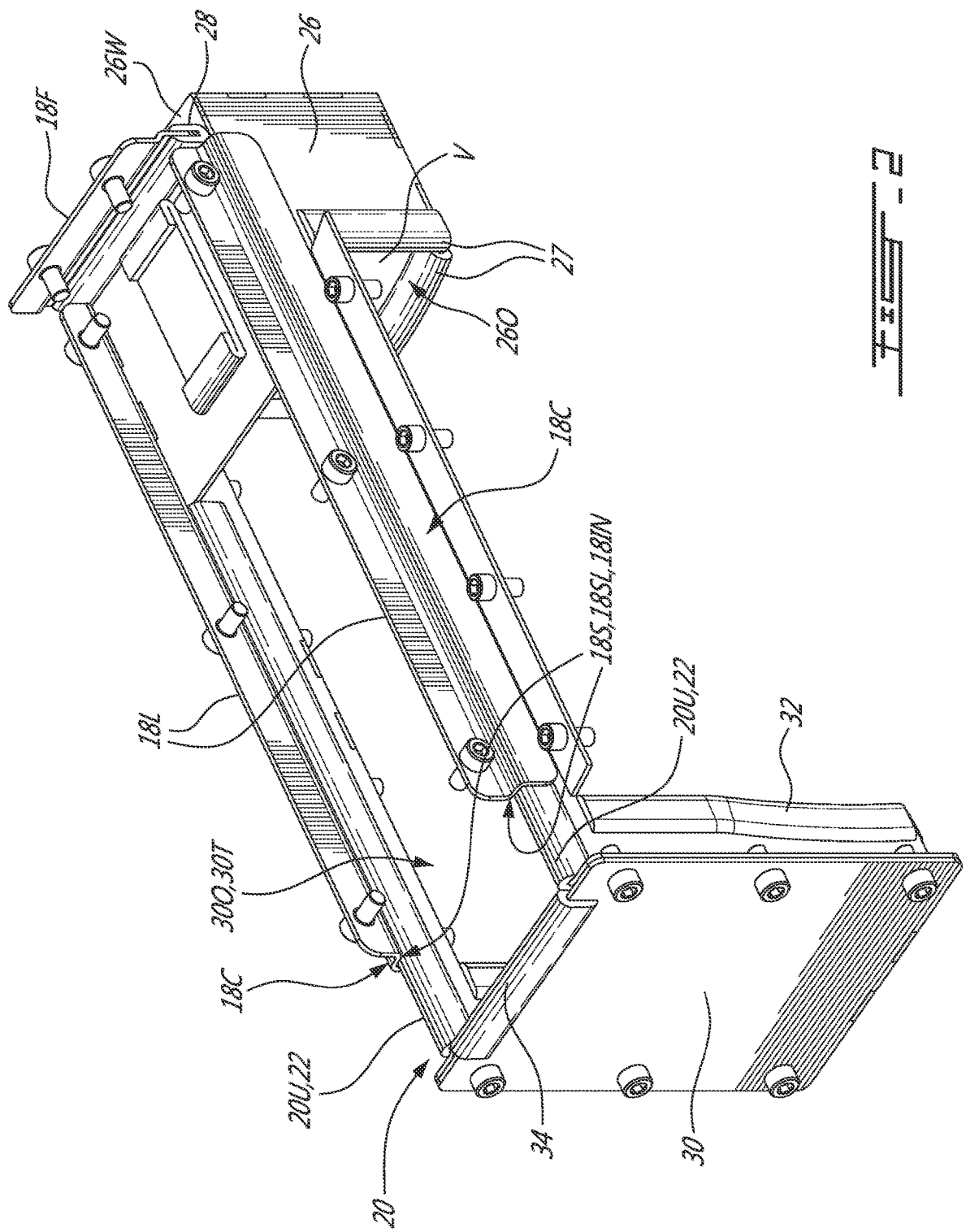

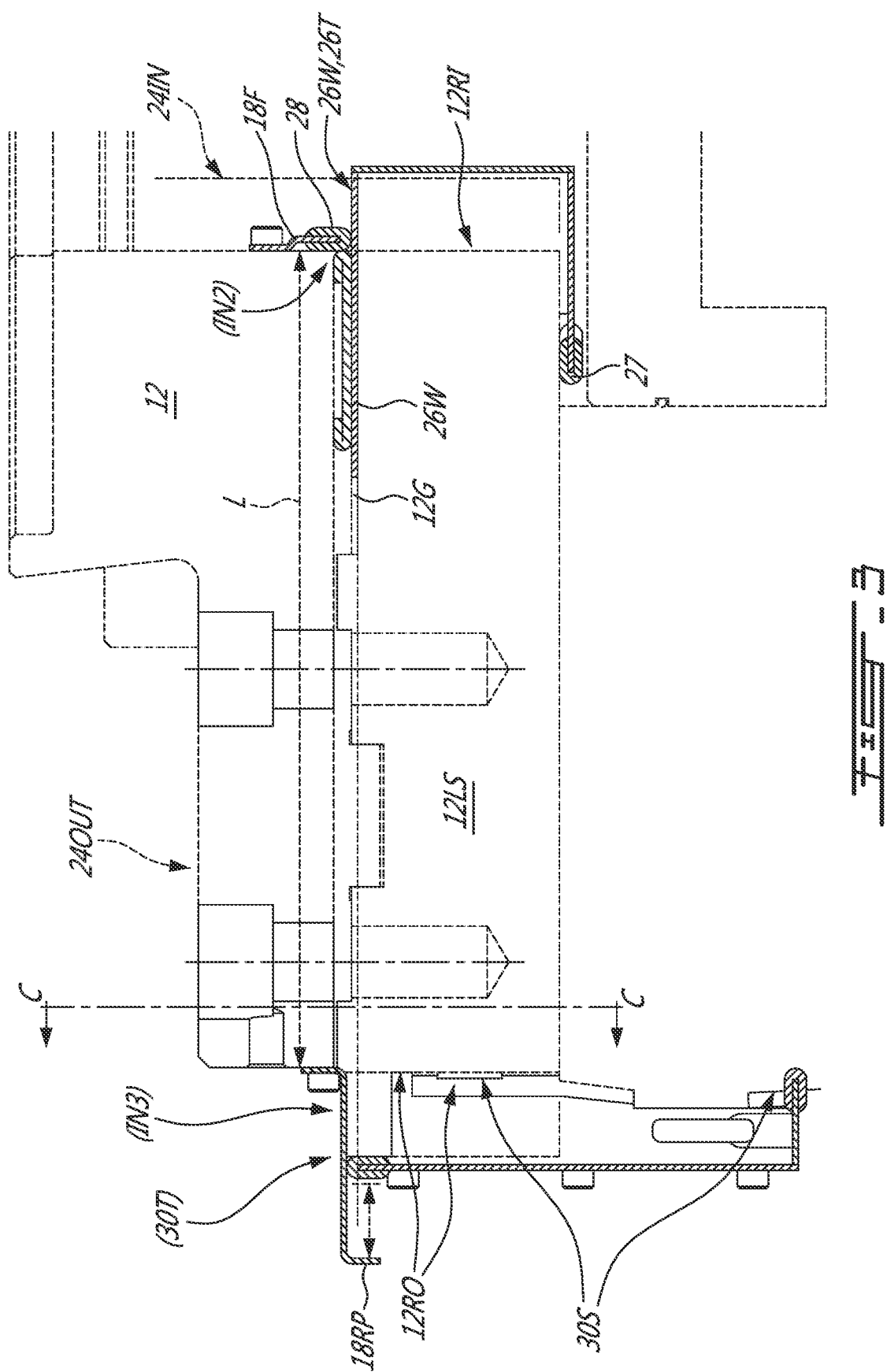

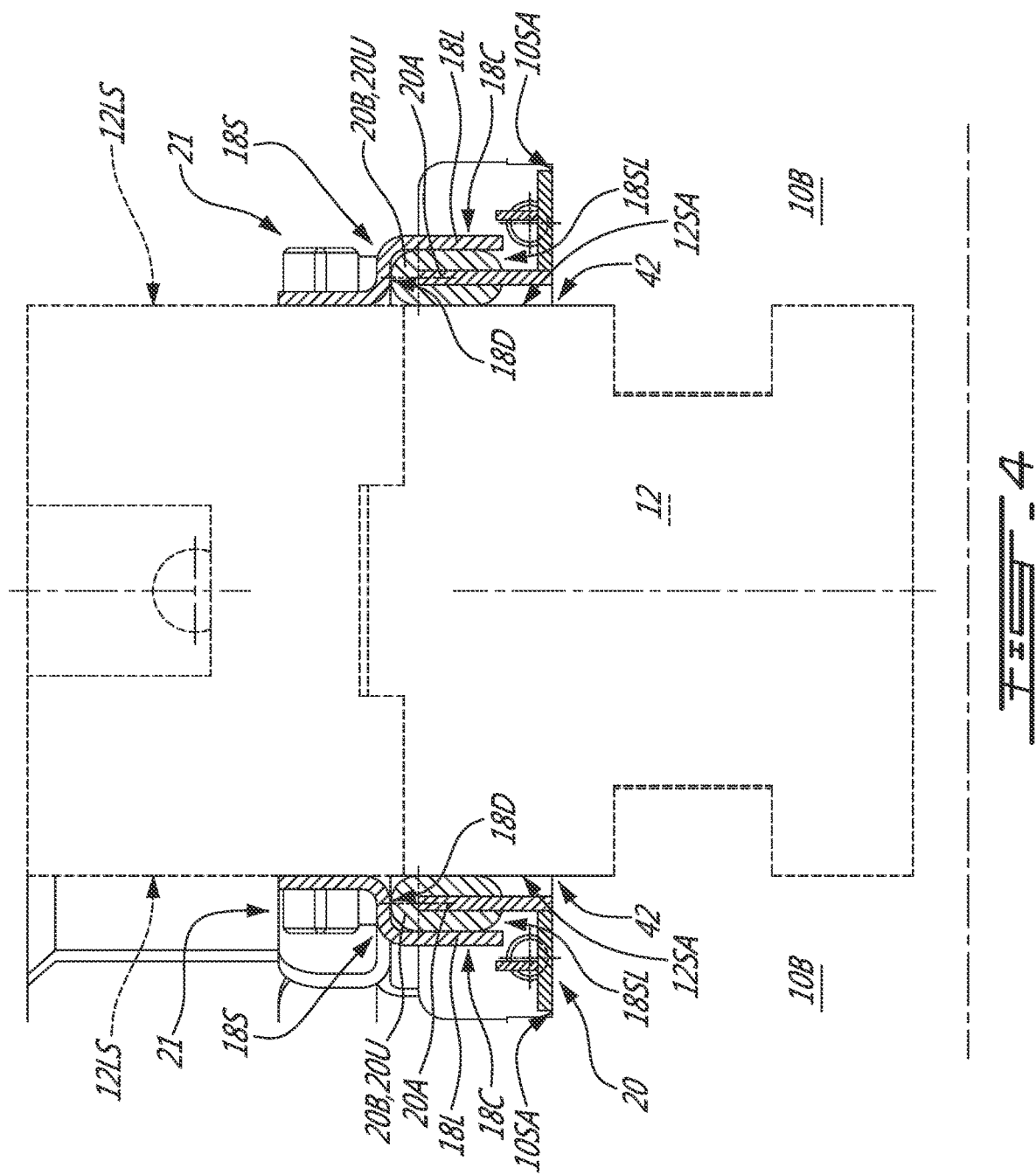

FIG. 5

Attaching a downwardly-extending rail to a lateral side of a jaw such that a portion of the downwardly-extending rail extends away from the lateral side toward a bottom of a respective slot.

Attaching an upwardly-extending rail to a surface defining the slot.

Sealing the interface by slidably and sealingly mating the upwardly-extending rail with the downwardly-extending rail by inserting the upwardly-extending rail into a space defined between that portion of the downwardly-extending rail and the lateral side of the jaw.

CHUCK FOR MACHINE TOOL AND SEALING SYSTEM

CROSS-REFERENCE

This application claims priority from U.S. Application No. 62/878,483, entitled "CHUCK FOR MACHINE TOOL AND SEALING SYSTEM", filed Jul. 25, 2019, the contents of which are hereby expressly incorporated herein by reference.

TECHNICAL FIELD

The application relates generally to sealing systems for chucks for machine tools.

BACKGROUND OF THE ART

Prior art sealing systems for chucks of machine tools may be suitable for their intended purposes in at least some applications. However, improvements to such tools and sealing systems are always desirable.

SUMMARY

In one aspect, there is provided a chuck for a machine tool, comprising: a body rotatable about a rotation axis and defining a plurality of slots extending radially in the body; a plurality of jaws received in corresponding ones of the plurality of slots, the jaws being radially movable relative to the body between an inward position and an outward position; and for at least one of the plurality of jaws, a sealing layer disposed in the slot receiving the at least one of the plurality of jaws and sealing an interface between opposed lateral sides of the at least one jaw and a surface of the body defining the slot receiving the at least one of the plurality of jaws.

In some embodiments, the surface of the body defines a bottom of that slot.

In some embodiments, a first part of the sealing layer is attached to a corresponding one of the opposed lateral sides of the at least one of the plurality of jaws, and a second part of the sealing layer is attached to the surface of the body and slidingly and sealingly engages the first part of the sealing layer.

In some embodiments, the first part of the sealing layer includes a downwardly-extending rail extending away from the at least one of the plurality of jaws toward the surface of the body, and the second part of the sealing layer includes an upwardly-extending rail received in a slot defined between a portion of the downwardly-extending rail and the corresponding one of the opposed lateral sides of the at least one of the plurality of jaws.

In some embodiments, the downwardly-extending rail extends laterally outward of and over the upwardly-extending rail.

In some embodiments, at least one of the downwardly-extending rail and the upwardly-extending rail includes a seal that slidably and sealingly engages the other one of the downwardly-extending rail and the upwardly-extending rail.

In some embodiments, the chuck further comprises a radially-inward enclosure connected to radially-inward ends of the upwardly-extending rails corresponding to the at least one of the plurality of jaws, the first enclosure: abutting a radially-inward surface of the body of the chuck to seal an interface between a radially-inward end of the at least one of the plurality of jaws and the radially-inward surface, and defining a volume therein and an opening into the volume, the opening and the volume receiving at least a part of the radially-inward end therein when the at least one of the plurality of jaws is in its inward position.

In some embodiments, the chuck further comprises a radially-outward enclosure connected to radially-outward ends of the upwardly-extending rails corresponding to the at least one of the plurality of jaws, the second enclosure: abutting a radially-outward surface of the body of the chuck to seal an interface between a radially-outward end of the at least one of the plurality of jaws and the radially-outward surface, and defining a volume therein and an opening into the volume, the opening and the volume of the radially-outward enclosure receiving at least a part of the radially-outward end therein when the at least one of the plurality of jaws is in its outward position.

In some embodiments, the chuck further comprises a splash-guard attached to the radially-inward end of the at least one of the plurality of jaws and extending down to and sealingly and slidingly engaging a top wall of the radially-inward enclosure of the at least one of the plurality of jaws while the at least one of the plurality of jaws is anywhere between its inward position and its outward position.

In some embodiments, the chuck further comprises a splash-guard attached to the radially-outward end of the at least one of the plurality of jaws and sealingly and slidingly engaging a top portion of the radially-outward enclosure of the at least one of the plurality of jaws while the at least one jaw of the plurality of jaws is anywhere between its inward position and its outward position.

In some embodiments, the splash-guard attached to the radially-outward end of the at least one of the plurality of jaws includes a downwardly-projecting portion that abuts the top portion of the radially-outward enclosure of the at least one of the plurality of jaws when the at least one of the plurality of jaws is in its outward position.

In another aspect, there is provided a sealing system for a jaw in a slot of a chuck rotatable about a rotation axis, the sealing system comprising: a pair of downwardly-extending rails to be attached one to each of two opposed lateral sides of the jaw, each of the pair of downwardly-extending rails defining a downwardly-open slot between that downwardly-extending rail and a corresponding one of the lateral sides of the jaw when that downwardly-extending rail is attached to that lateral side, and a pair of upwardly-extending rails to be attached to the body in the slot, each of the upwardly-extending rails being shaped to slidingly and sealingly fit into a corresponding one of the slots when the sealing system is in use.

In some embodiments, each of the upwardly-extending rails includes a seal that fits into the corresponding one of the slots and slidingly and sealingly engages both: a) the one of the downwardly-extending rails defining that slot, and b) the one of the lateral sides defining that slot.

In some embodiments, the sealing system further comprises a pair of enclosures connected at opposed radial end of the upwardly-extending rails, each of the enclosures being shaped to sealingly abut a corresponding portion of the chuck and to receive at least a portion of a corresponding radial end of the jaw therein.

In some embodiments, the sealing system further comprises a pair of splash-guards to be attached to respective radial ends of the jaw to slidingly and sealingly engage a top of a respective one of the enclosures when the sealing system is in use.

In some embodiments, each of the splash-guards includes a seal and slidingly and sealingly engages the top of the respective one of the enclosures via the seal when the sealing system is in use.

In another aspect, there is provided a method of sealing an interface between a surface defining a slot of a chuck rotatable about a rotation axis and a lateral side of a jaw received in that slot, comprising: attaching a downwardly-extending rail to the lateral side of the jaw such that a portion of the downwardly-extending rail extends away from the lateral side toward a bottom of the slot; attaching an upwardly-extending rail to the surface defining the slot; and sealing the interface by slidably and sealingly mating the upwardly-extending rail with the downwardly-extending rail by inserting the upwardly-extending rail into a space defined between that portion of the downwardly-extending rail and the lateral side of the jaw.

In some embodiments, the sealing the interface includes covering the upwardly-extending rail with the downwardly-extending rail by extending the downwardly-extending rail laterally outward and over the upwardly-extending rail.

In some embodiments, the method further comprises sealing an interface between each radial end of the jaw and a corresponding portion of the slot by abutting a volumetric enclosure over the interface.

In some embodiments, the method further comprises sealing an interface between each radial end of the jaw and a top of a corresponding one of the volumetric enclosures.

DESCRIPTION OF THE DRAWINGS

Reference is now made to the accompanying figures in which:

FIG. 2 is a perspective view of a sealing system for the chuck of FIG. 1;

FIG. 3 is a section view of the sealing system of FIG. 2 mounted to the chuck of FIG. 1;

FIG. 4 is a section view of the sealing system and the chuck of FIG. 3, taken along section line C-C of FIG. 3; and FIG. 5 is a method of sealing an interface between a jaw and a base of the chuck.

DETAILED DESCRIPTION

Figure 1:
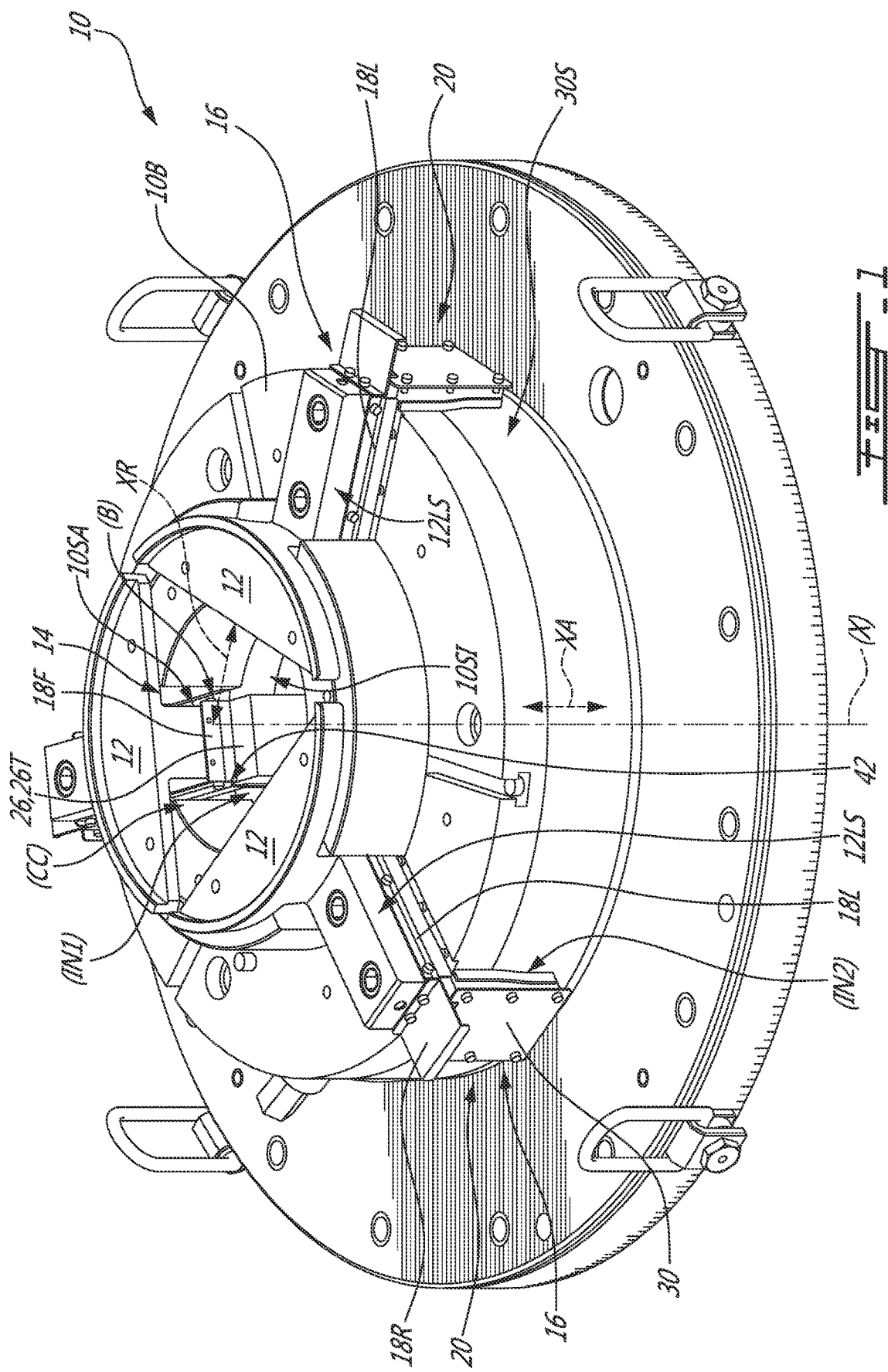
FIG. 1 is a perspective view of a chuck for a machine tool.

FIG. 1 illustrates a chuck 10 for a machine tool, the chuck 10 having movable jaws 12, with each of the jaws 12 having two lateral sides 12LS. The chuck 10 includes a body 10B configured for rotation about a rotation axis (X), which may be the rotation axis of a spindle and/or a mandrel of the machine tool onto which the chuck 10 may be configured to be mounted. Machine tools, spindles, and mechanisms for attaching a chuck thereto are known, and are therefore not shown or described in detail herein. The chuck 10 may be configured to be mountable to any given machine tool and/or spindle, mandrel, or other rotating member using for example a conventional structure at a rear side of the chuck 10, opposite the side with the jaws 12.

As shown in FIG. 1, the jaws 12 of the chuck 10 are received in respective radially-extending slots 14 defined in the body 10B. For clarity only one of the slots 14 has been labeled in FIG. 1. The jaws 12 are movable in the respective slots 14 radially inward to an inward position 24IN for securing a workpiece (not shown) received in a central cavity (CC) of the chuck 10 defined by a radially-inward surface defining the central cavity (CC), and/or between the jaws 12. The jaws 12 are also movable in the respective slots 14 radially outward to an outward position 24OUT, for releasing the workpiece from the chuck 10. To effect the selective radial movement of the jaws 12, any suitable conventional mechanism may be used, and therefore such a mechanism is not shown or described in detail herein. Similarly, any suitable number of movable jaw(s) 12 and respective slot(s) 14 may be used.

In this embodiment, each of the jaws 12 is connected with a sealing system 16 disposed in part between that jaw 12 and the slot 14 receiving that jaw 12. While in this embodiment the chuck 10 has three jaws 12, in other embodiments any other suitable number of jaws 12 may be used. Each of the sealing systems 16 in this embodiment is the same, and therefore this description focuses on one of the sealing systems 16. In other embodiments, one or more of the sealing systems 16 may have a different configuration than one or more of the rest of the sealing systems 16. In the present embodiment, and now also referring to FIG. 2, each sealing system 16 includes a pair of lateral splash-guards 18L, a front splash-guard 18F, and a rear splash-guard 18R (FIG. 1). The splash-guards 18L, 18F, 18R of each sealing system 16 are attached to the respective jaw 12 for sealing engagement with the lateral sides 12LS of that jaw 12 and with a cage 20 of that sealing system 16. In some embodiments, one or more of the splash-guards 18L, 18F, 18R may be integral with the respective jaw 12. As shown, the cage 20 is in part received in a corresponding one of the slots 14 and attached to the body 10B of the chuck 10.

Referring to FIGS. 2 and 3, in a given sealing system 16, the lateral splash-guards 18L define respective downwardly-extending rails 18D extend laterally away from the respective lateral sides 12LS via respective offsets 18S and that extend along a length (L) (FIG. 3) of the respective jaw 12. More particularly, the lateral splash-guards 18L include covering portions 18C that extend laterally outward and over respective parts of the cage 20, along a length (L) of the jaw 12 between the lateral sides of the jaw 12 and the surfaces of the body 10B of the chuck 10 that define the respective slot 14 in which the jaw 12 is received. The downwardly-extending rails 18D/covering portions 18C define downwardly-open slots 18SL between the downwardly-extending rails 18D and the jaw 12.

The downwardly-open slots 18SL slidably and sealingly receive therein respective upwardly-extending rails 20U of the cage 20. The downwardly-extending rails 18D defined by the lateral splash-guards 18L thereby slidably and sealingly mate with the respective upwardly-extending rails 20U. More particularly, in this embodiment, each of the upwardly-extending rails 20U includes an upwardly-extending plate 20A and an elastomeric seal 20B attached to the plate 20A over an upper edge of the plate 20A. The elastomeric seals 20B, and thus the rails 20U, slidably and sealingly fit into and fill a width of the respective downwardly-open slots 18SL. The downwardly-extending rails 18D extend laterally outward of and over the respective ones of the upwardly-extending rails 20U and thereby cover the respective upwardly-extending rails 20U, helping to prevent ingress of oil and/or debris during use into interfaces 18IN between the respective rails 18D, 20U.

The seals 20B may be made from any material suitable for each given embodiment and application of the chuck 10. In some embodiments, one or more of the seals 20B may be made from a non-elastomeric material, such as an ultra-high-molecular-weight (UHMW) plastic for example. In other embodiments, one or more of the seals 20B may be attached to one or more of the downwardly-extending rails 18D for example. In some embodiments, both the upwardly-extending rails 20U and the downwardly-extending rails 18D may include respective one or more seals 20B. In some embodiments, one or more of the seals 20B may be integral to the respective element to which they may be attached, such as for example when both a plate 20A and the seal 20B mounted to the plate 20A are made from a UHMW plastic. In some embodiments, one or more of the seals 20B may be omitted, such as for example in embodiments in which the rails 18D and 20U are made from plastic and slidably and sealingly directly mate with each other.

The upwardly-extending rails 20U in this embodiment are attached to a surface 10SA (FIG. 4) of the body 10B that defines the bottom 10SA of the respective slot 14. In other embodiments, the rails 18D and/or 20U may be shaped differently to provide similar functionality as described above. For example, in some embodiments the rails 20U may be shaped to be attached to one or more different parts of the body 10B, such as for example to the surfaces defining the lateral sides of the respective slot 14. In summary, in each embodiment, the slidable and sealing engagement of the rails 18D, 20U provides a sealing layer 21 disposed between and sealing an interface between opposed axially extending lateral sides 12LS of the jaw 12 and corresponding ones of axially extending surfaces 10SA of the body 10B defining the respective slot 14. As noted above, in this particular embodiment, the relevant surfaces 10SA of the body 10B are those that define the bottom of the slot 14. Referring to FIG. 3, the slidable sealing engagement described above helps prevent or limit ingress of oil and/or debris therethrough while allowing the respective jaw 12 to slide between the inward position 24IN and the outward position 24OUT.

Referring to FIGS. 2 and 3, for sealing interface(s) between the radially-inward end 12RI of the jaw 12 and the part(s) of the body 10B of the chuck 10 defining the central cavity (CC) as the jaw 12 moves between its inward and outward positions 24IN, 24OUT, the cage 20 includes a box 26 attached to the upwardly-extending rails 20U at radially-inward sides thereof. In this embodiment, the box 26 is disposed at least in part inside the central cavity (CC) of the chuck 10. The box 26 is an example of a box-shaped, or bucket-shaped, volumetric enclosure 26. For the purposes of this document, the term "volumetric" means that the enclosure 26 defines a volume (V) (FIG. 2) therein which is shaped to receive a part of the radially-inward end 12RI of the jaw 12 therein to allow for movement of the jaw 12 to its inward position 24IN. It is contemplated that the box 26 may be shaped differently to accommodate different embodiments of the chuck 10 and/or the jaw 12, and/or may be a different enclosure that may not necessarily be shaped as a box or a bucket, but may provide for similar functionality.

In this embodiment, the box 26 has a single opening 26O facing the radially-inward end 12RI of the jaw 12. In an aspect, and as shown in FIG. 3, the opening 26O is sized to receive at least a part of the radially-inward end 12RI therein to a depth sufficient to allow the jaw 12 to move to its inward position 24IN. In another aspect, the edges and/or portions of the box 26 defining the opening 26O include one or more elastomeric seals 27 thereon for ceiling the opening 26O against a corresponding surface of the body 10B of the chuck 10. It is contemplated that any suitable sealing arrangement and/or seal(s) may be used instead of the one or more elastomeric seals 27. As an example, the seal(s) 27 or other sealing member(s) may be integral to the box 26, such as for example in embodiments in which the box 26 may be made from a plastic.

Further in this embodiment, the box 26 includes a top wall 26W that extends into a radially extending gap 12G defined at least in the radially-inward end 12RI of the jaw 12 and extending toward the radially-outward end 12RO of the jaw 12. More particularly, the top wall 26W may extend into the gap 12G at least when the jaw 12 is in its inward position 24IN. In this embodiment, the radially extending gap 12G is sufficiently deep and the top wall 26W is dimensioned sufficiently long to extend into the gap 12G in all positions of the jaw 12 between the inward and outward positions 24IN, 24OUT. In an aspect, the top wall 26W helps seal an interior volume defined by the box 26, and the parts of the interface between the radially-inward end 12RI of the jaw 12 and the body 10B of the chuck 10 covered by the box 26. This may help reduce or prevent ingress of shavings and/or high pressure cutting oil jet(s) that may impinge upon an outer upper surface of the box 26 into the interface.

To an interface between a top 26T of the box 26 and the radially-inward end 12RI of the jaw 12, the front splash-guard 18F of the sealing system 16 extends down to and sealingly and slidingly engages the top wall 26W of the box 26. To this end, in this embodiment, the front splash-guard 18F includes one or more elastomeric seals 28. The seal(s) 28 is/are disposed along a bottom edge of the front splash-guard 18F to contact and slide along the top wall 26W as the jaw 12 moves between its inward position 24IN and its outward position 24OUT. The seal(s) 28 help seal the interface at the top wall 26W of the box 26 by protecting from and swiping away oil, shavings, and/or other contaminants that may contact the top wall 26W during use of the chuck 10. In other embodiments, the seal(s) 28 may be other types of seals and/or sealing members and/or may be integral to the front splash-guard 18F and/or may be omitted, for example depending on the particular material selected for the front splash-guard 18F.

Referring to FIGS. 2 and 3, for sealing interface(s) between the radially-outward end 12RO of the jaw 12 and the corresponding laterally outward part(s) of the body 10B of the chuck 10, the cage 20 further includes a box 30 attached to the upwardly-extending rails 20U at radially-outward sides thereof. In this embodiment, the box 30 is disposed on an outer circumference of a corresponding part of the body 10B, opposite the box 26. The box 30 is an example of a box-shaped, or bucket-shaped, volumetric enclosure 30. For the purposes of this document, the term "volumetric" means that the enclosure 30 defines a volume therein which is shaped to receive a part of the radially-outward end 12RO of the jaw 12 therein to allow for movement of the jaw 12 to its outward position 24OUT. It is contemplated that the box 30 may be shaped differently to accommodate different embodiments of the chuck 10 and/or the jaw 12, and/or may be a different enclosure that may not necessarily be shaped as a box or a bucket, but may provide for similar functionality.

More particularly, depending on the particular embodiment of the jaw 12 for example, the box 30 may define a single opening 30O facing toward the box 26. In an aspect, analogous to the opening 26O of the box 26, the opening 30O of the box 30 may be sized to receive at least a part the radially-outward end 12RO of the jaw 12 therein to a depth sufficient to allow the jaw 12 to move to its outward position 24OUT. In another aspect, analogous to the box 26, the edges of the box 30 defining its opening 30O may include and be defined by one or more elastomeric seals 32. The seal(s) may help seal the edges of the box 30 against the corresponding surface(s) of the body 10B of the chuck 10, which in this embodiment is a radially-outward surface 30S (FIG. 1) of the body 10B. It is contemplated that any suitable sealing arrangement and/or seal(s) may be used instead of the one or more elastomeric seals 32. As an example, the seal(s) 32 or other sealing member(s) may be integral to the respective parts of the box 30.

In some embodiments, such as the one illustrated for example, the jaw 12 may not have a sufficiently-large gap in the radially-outward end 12RO to receive a top wall of the box/enclosure 30 therein. Accordingly, as shown in FIG. 2 for example, a top 30T of the box 30 may be open. As shown, the edges the box 30 defining an open top 30T thereof may include and be defined by one or more elastomeric seals 34. In some embodiments, and depending for example on the material(s) selected for the box 30, the seal(s) 34 which are part of the box 30 may be integral to the rest of the box 30. In open top 30T embodiments, to help seal the top 30T and thus to help protect an interior volume defined by the box 30 from ingress of debris and/or cutting oil for example, the rear splash-guard 18R may slidingly and sealingly engage the top edges of the box 30.

In this embodiment, the top edges are defined by the one or more seal(s) 34, and thus the rear splash-guard 18R slidingly and sealingly engages the seal(s) 34, at all times as the jaw 12 moves between its inward position 24IN and its outward position 24OUT. The rear splash-guard 18R may thereby cover and/or seal the top 30T of the box 30 at all times as the jaw 12 moves between its inward position 24IN and its outward position 24OUT. As shown, the rear splash-guard 18R may be positioned to slide on top of the seal(s) 34, and may thereby help seal the box 30 from shavings and/or high pressure cutting oil jet(s) that may impinge upon the top 30T of the box 30.

Referring to FIG. 3, to help seal the box 30 and an interface between the radially-outward end 12RO of the jaw 12 and the corresponding radially-outward part of the chuck 10, the rear splash-guard 18R may include a downwardly-projecting portion 18RP. As shown schematically with a double-ended arrow in FIG. 3, the downwardly-projecting portion 18RP may be positioned to allow the jaw 12 to move between its inward position 24IN and its outward position 24OUT, and to abut a top edge of the box 30 when the jaw 12 is in its inward position 24IN. In this embodiment the top edge of the box/enclosure 30 is defined by the seal(s) 34. The downwardly-projecting portion 18RP may therefore be said to abut a corresponding top portion of the box 30 when the jaw 12 is in its inward position 24IN, which top portion may or may not be defined by a seal. In other embodiments, the seal 34 may be on the rear splash-guard 18R and/or the downwardly-projecting portion 18RP thereof for example, and/or may be omitted.

With the structure described above in mind, and now referring to FIG. 5, the present technology provides a method 40 of sealing an interface 42 between a surface 10SA defining a slot 14 of a chuck 10 rotatable about a rotation axis (X), and a lateral side 12LS of a jaw 12 received in that slot 14. As seen above, in some embodiments, the method 40 may include attaching a downwardly-extending rail, such as a corresponding one of the rails 18D defined by the lateral splash-guards 18L for example, to the lateral side of the jaw 12 such that a portion of the downwardly-extending rail 18D extends away from the lateral side 12LS toward a bottom (B) of the slot 14. In some embodiments, the method 40 may also include attaching an upwardly-extending rail 20U to the surface defining the slot 14, such as the surface 10SA defining the bottom (B) of the slot 14 for example. In some embodiments, the method 40 may also include sealing the interface 42 by slidably and sealingly mating the upwardly-extending rail 20U with the downwardly-extending rail 18D by inserting the upwardly-extending rail 20U into a space 18SL defined between that portion 18C of the downwardly-extending rail 18D and the lateral side 12LS of the jaw 12.

In some embodiments, the step of sealing the interface 42 may include covering the upwardly-extending rail 20U with the downwardly-extending rail 18D/splash-guard 18L by extending the downwardly-extending rail 18D/splash-guard 18L laterally outward and over the upwardly-extending rail 20U. In some embodiments, the method 40 may also include sealing an interface (IN1), (IN2), best shown in FIG. 1, between each radial end 12RO, 12RI of the jaw 12 and a corresponding portion of the slot 14 by abutting a volumetric enclosure 26, 30 over the interface (IN1), (IN2). In some embodiments, the method 40 may also include sealing an interface (IN3), (IN4), best shown in FIG. 3, between each radial end 12RO, 12RI of the jaw 12 and a top 26T, 30T of a corresponding one of the volumetric enclosures 26, 30, such as for example by extending respective splash-guards 18F, 18R from the respective radial ends 12RO, 12RI to the respective tops 26T, 30T of the enclosures 26, 30.

The above description is meant to be exemplary only, and one skilled in the art will recognize that changes may be made to the embodiments described without departing from the scope of the technology disclosed. For example, the above embodiments of the sealing systems 16 may be made using any materials, such as for example stamped metal and rubber for the respective plates and seals, and any manufacturing and assembly techniques that may be suitable for each particular embodiment and application of the chuck 10. For example, while the lateral splash guards 18L in the illustrated embodiments may be made from respective metal plates bolted or screwed to the jaws 12, in other embodiments and depending on the intended application of the chuck 10, one or more of the lateral splash guards 18L may be made from a suitable plastic. For example, while some of the elements above are described as being made from multiple parts and/or as attached to other element(s), in other embodiments one or more of the elements may be made, for example using a different suitable material(s) and/or different suitable manufacturing and/or assembly methods, from a single part and/or may be made integral to one or more of the respective elements instead of being attached thereto with fasteners for example.

As another example, while the front splash guards 18F in the illustrated embodiments may be made from respective metal plates bolted or screwed to the jaws 12 and having rubber seals 28 at their bottom edges, in other embodiments and depending on the intended application of the chuck 10, one or more of the front splash guards 18F may be made from a suitable plastic and may not have separately-defined seals. Similar modifications may be applicable to the rear splash guards 18R for example. Still other modifications which fall within the scope of the present technology will be apparent to those skilled in the art, in light of a review of this disclosure.

The invention claimed is:
1. A chuck for a machine tool, comprising:
a body rotatable about a rotation axis and defining a plurality of slots extending radially in the body;
a plurality of jaws received in corresponding ones of the plurality of slots, the jaws being radially movable relative to the body between an inward position and an outward position; and
for at least one of the plurality of jaws, a sealing layer disposed in the slot receiving the at least one of the plurality of jaws and sealing an interface between opposed lateral sides of the at lea one jaw and a surface of the body defining the slot receiving the at one of the plurality of jaws, wherein the surface of the body defines a bottom of that slot, and wherein a first part of the sealing layer is attached to a corresponding one of the opposed lateral sides of the at least one of the plurality of jaws, and a second part of the sealing layer is attached to the surface of the body and slidingly and sealingly engages the first part of the sealing layer.

2. The chuck of claim 1, wherein:
the first part of the sealing layer includes a downwardly-extending rail extending away from the at least one of the plurality of jaws toward the surface of the body, and
the second part of the sealing layer includes an upwardly-extending rail received in a slot defined between a portion of the downwardly-extending rail and the corresponding one of the opposed lateral sides of the at least one of the plurality of jaws.

3. The chuck of claim 2, wherein the downwardly-extending rail extends laterally outward of and over the upwardly-extending rail.

4. The chuck of claim 3, wherein at least one of the downwardly-extending rail and the upwardly-extending rail includes a seal that slidably and sealingly engages the other one of the downwardly-extending rail and the upwardly-extending rail.

5. The chuck of claim 4, further comprising a radially-outward enclosure connected to radially-outward ends of the upwardly-extending rails corresponding to the at least one of the plurality of jaws, the radically-inward enclosure:
abutting a radially-inward surface of the body of the chuck to seal an interface between a radially-inward end of the at least one of the plurality of jaws and the radially-outward surface, and
defining a volume therein and an opening into the volume, the opening and the volume receiving at least a part of the radially-inward end therein when the at least one of the plurality of jaws is in its outward position.

6. The chuck of claim 5, further comprising a radically-outward enclosure connected to radially-outward ends of the upwardly-extending rails corresponding to the at least one of the plurality of jaws, the radially-outward enclosure:
abutting a radially-outward surface of the body of the chuck to seal an interface between a radially-outward end of the at least one of the plurality of jaws and the radially-outward surface, and
defining a volume therein and an opening into the volume, the opening and the volume of the radially-outward enclosure receiving at least a part of the radially-outward end therein when the at least one of the plurality of jaws is in its outward position.

7. The chuck of claim 6, further comprising, a splash-guard attached to the radially-inward end of the at least one of the plurality of jaws and extending down to and sealingly and slidingly engaging a top wall of the radially-inward enclosure of the at least one of the plurality of jaws while the at least one of the plurality of jaws is anywhere between its inward position and its outward position.

8. The chuck of claim 7, further comprising a splash-guard attached to the radially-outward end of the at least one of the plurality of jaws and sealingly and slidingly engaging a top portion of the radially-outward enclosure of the at least one of the plurality of jaws while the at least one jaw of the plurality of jaws is anywhere between its inward position and its outward position.

9. The chuck of claim 8, wherein the splash-guard attached to the radially-outward end of the at least one of the plurality of jaws includes a downwardly-projecting portion that abuts the top portion of the radially-outward enclosure of the at least one of the plurality of jaws when the at least one of the plurality of jaws is in its outward position.

10. The chuck of claim 1,
wherein the first part comprises a pair of downwardly-extending rails attached one to each of two opposed lateral sides of the at least one of the plurality of jaws, each of the pair of downwardly-extending rails defining a downwardly-open slot between that downwardly-extending rail and a corresponding one of the lateral sides of the at least one of the plurality of jaws, and
wherein the second part comprises a pair of upwardly-extending rails attached to the body in the slot of the plurality of slots, each of the upwardly-extending rails being shaped to slidingly and sealingly fit into a corresponding one of the plurality of slots.

11. The chuck of claim 10, wherein each of the upwardly-extending rails includes a seal that fits into the corresponding one of the plurality of slots and slidingly and sealingly engages both: a) the one of the downwardly-extending rails defining that slot, and b) the one of the lateral sides defining that slot.

12. The chuck of claim 11, further comprising a pair of enclosures connected at opposed radial end of the upwardly-extending rails, each of the enclosures being shaped to sealingly abut a corresponding portion of the chuck and to receive at least a portion of a corresponding radial end of the at least one of the plurality of jaws therein.

13. The chuck of claim 12, further comprising a pair of splash-guards to be attached to respective radial ends of the jaw to slidingly and sealingly engage a top of a respective one of the enclosures.

14. The chuck of claim 13, wherein each of the splash-guards includes a seal and slidingly and sealingly engages the top of the respective one of the enclosures via the seal.

* * * * *